July 24, 1962   J. H. LOBECK ETAL   3,046,065
DIVIDED RETAINER FOR ROLLER BEARINGS
Filed Dec. 22, 1960
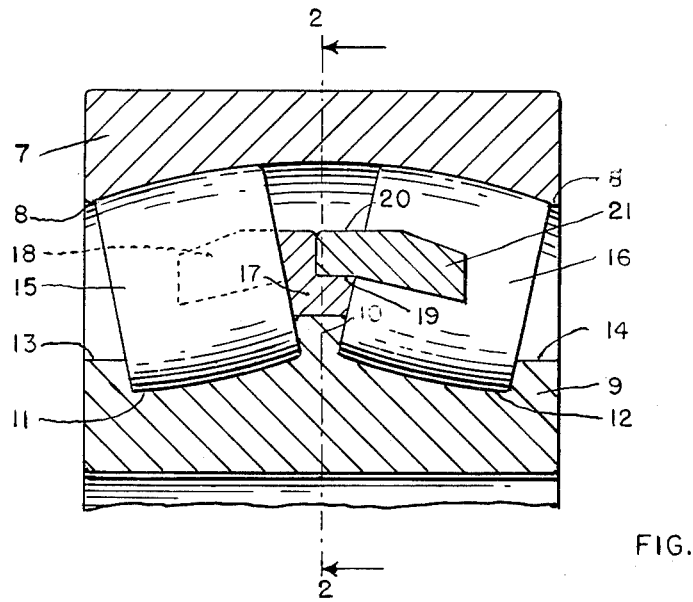
FIG. 1.
FIG. 3.   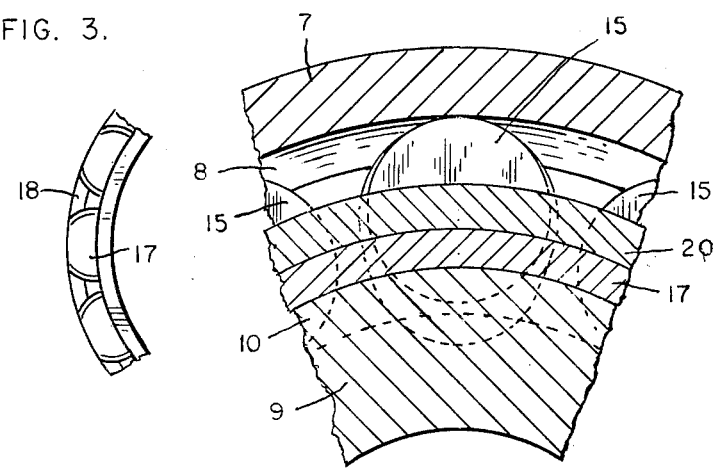   FIG. 4.
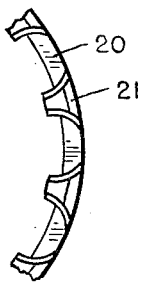
FIG. 2.
JOHN H. LOBECK
WALTER FISHER JR
INVENTORS
ATTORNEYS

United States Patent Office 3,046,065
Patented July 24, 1962

3,046,065
DIVIDED RETAINER FOR ROLLER BEARINGS
John H. Lobeck and Walter Fisher, Jr., South Bend, Ind., assignors to Bantam Bearings Division, The Torrington Company, South Bend, Ind.
Filed Dec. 22, 1960, Ser. No. 77,548
5 Claims. (Cl. 308—217)

The specification which follows relates to a novel divided retainer for roller bearings adapted for high speeds and heavy loads.

The conventional designs for self-aligning spherical roller bearings are based upon the use of a center guiding flange or rib between two series of asymmetrical or symmetrical rollers. This arrangement, however, places a limitation upon the amount of bearing surface possible with a given over-all dimension. In other words, it is impossible to bring the two series of rollers very close together. Elimination of the center rib is a frequent cause of difficulties in high speeds and under heavy loads.

It is an object of this invention to increase the relative extent or length of the rollers for given over-all dimensions of the bearing unit.

It is a further object of the invention to provide independent retaining members for each series of rollers of a novel cooperating design.

It is another object of the invention to provide the novel two-part retainer in combination with the conventional center guiding rib to withstand the stresses imposed by the ends of the rollers.

It is a still further object of the invention to provide a divided retainer in which one member forms the entire support for both members on the center guide rib.

Other objects of the invention will be evident from the following description of the preferred form of the invention as illustrated by way of example in the accompanying drawings in which FIG. 1 is a transverse vertical section of the improved self-aligning spherical roller bearing;

FIG. 2 is a fragmentary vertical section at right angles to the plane of FIG. 1 and taken on the line 2—2 of FIG. 1;

FIG. 3 is a fragmentary vertical end view of the supporting member of the retainer, and FIG. 4 is a fragmentary end view of the supported member of the retainer.

Broadly stated, the invention consists in retaining the center guiding rib in a self-aligning roller bearing with the consequent advantages. At the same time this rib is reduced in height and width to allow for increased length of the bearing rollers, bringing them closer together, and still within the usual over-all dimensions of the bearing. The center rib is also utilized as a support on which one member of the retainer will rest and slide. This retainer member will also provide a bearing on which the other retainer member will be received and slide with a minimum of friction. Each retainer member is capable of independent sliding movement relative to the other member and to the guiding ring.

In the drawing a fragmentary section is shown of the outer bearing member 7 having a spherical raceway 8 on the inner bearing surface.

The inner bearing member 9 has a center guiding flange or rib 10 of the usual type. It differs, however, from the former ribs in that it can be of lesser height and materially less width. This permits the rollers to be brought closer together or in other words, longer rollers can be used without exceeding the usual distance between their outer edges.

The inner bearing member 9 has two spherical raceways 11 and 12. These raceways adjoin the center rib 10. They extend outwardly to outer flanges 13 and 14.

A series of asymmetrical or symmetrical rollers 15 is mounted on the inner raceway 11 and fit against spherical raceway 8 of the outer member 7. A second series of asymmetrical or symmetrical rollers 16 extend likewise between the raceway 12 and the outer spherical raceway 8. In each case the two series 15 and 16 abut against the center rib 10 and one of the flanges 13 or 14.

There is provided a main retainer ring 17. This has a base which rests slidingly upon the top of the rib 10 as shown in FIG. 1. This ring 17 is substantially the same width across its bottom as the top face of the rib 10. This ring has a series of fingers 18 which serve to support the adjacent rollers 15.

Each finger 18 extends outwardly parallel to the axis of the bearing and ends in a definite slope inward toward that axis. The inner surface of the fingers 18 also slopes toward the axis without, however, extending inwardly beyond the contacting surface of the rib 10 and the ring 17.

The inner portion of the retainer ring 17 opposite the fingers 18 is cut away to form a ledge 19. This ledge extends more than one-half the width of the ring 17 at this point. This ledge forms a support on which the second retaining ring slides.

The ledge 19 will be seen to be substantially in the plane of the root of the fingers 18.

A second or auxiliary retainer ring 20 has a base which rests upon the ledge 19 and fills the entire space created by this ledge. The members 17 and 20 are constructed of light weight metal alloys or plastic compounds which may be cast or machined to precise dimensions. The ring 20 extends for the full height of the ring 17. It also has fingers 21 similar in form to those described for the fingers 18.

By this arrangement the two-part retainer may be fitted with its parts separately in position on the two series of bearing rollers and in the position shown in FIG. 1.

The base of the ring 17 replaces a large amount of the guiding rib formerly necessary. The rib 10 is therefore restricted to the primary function of preserving the two series of rollers in alignment. The retainer has its main portion resting upon the rib 10. In turn this main portion forms a main bearing upon which the auxiliary portion is independently slidable.

Each ring 17 and 20 is suitably bored transversely between the fingers 18 and 21 either cylindrically or otherwise to conform to the shape of the rollers being used.

The importance of this relation of parts is emphasized under operating conditions of maximum load and speed. Here the durability of the design including the central rib is manifest, while at the same time advantage is taken of the particular interfitted independently operating retainer parts. The latter are not under the stresses that might otherwise be imposed by the inner end surfaces of the opposing rollers.

While the above description illustrates the preferred form of the invention, it will be evident that minor changes in material and proportions can be made without departing from the scope of the invention as defined in the following claims.

What we claim is:

1. A spherical roller bearing comprising an outer member with an inner spherical raceway, an inner member having a center guiding rib, a concave raceway on each side of said rib and opposite the spherical raceway, a series of rollers in each concave raceway engaging the spherical raceway, a retainer between the two series of rollers, said retainer having a ring slidably carried on said center rib, a series of spaced fingers on said ring for separating the rollers of one series, said ring having a ledge over the entire center rib, a second ring slidably carried on the ledge and fingers on the second ring separating the rollers of the second series.

2. A spherical roller bearing comprising an outer member with an inner spherical raceway, an inner member having a center guiding rib, a concave raceway on each side of said rib and opposite the spherical raceway, a series of rollers in each concave raceway engaging the spherical raceway, a retainer between the two series of rollers, said retainer having a ring slidably carried on said center rib and of substantially the same width as the top of said rib, a series of spaced fingers on said ring for separating the rollers of one series, said ring having a ledge over the entire center rib, a second ring slidably carried on the ledge and fingers on the second ring separating the rollers of the second series.

3. A spherical roller bearing comprising an outer member with an inner spherical raceway, an inner member having a center guiding rib, a concave raceway on each side of said rib and opposite the spherical raceway, a series of rollers in each concave raceway engaging the spherical raceway, a retainer between the two series of rollers, said retainer having a ring slidably carried on said center rib, a series of spaced fingers on the upper part of said ring for separating the rollers of one series, said ring having a ledge over the entire center rib opposite the lower edges of said fingers, a second ring slidably carried on the ledge and fingers on the second ring separating the rollers of the second series.

4. A spherical roller bearing comprising an outer member with an inner spherical raceway, an inner member having a center guiding rib, a concave raceway on each side of said rib, and opposite the spherical raceway, a series of rollers in each concave raceway engaging the spherical raceway, a retainer between the two series of rollers, said retainer having a ring slidably carried on said center rib with a bottom of substantially the same width as the top of said rib, a series of spaced fingers on said ring for separating the rollers of one series, said ring being formed for the major portion of its median width with a transverse ledge, a second ring slidably carried on the ledge and fingers on the second ring separating the rollers of the second series.

5. A spherical roller bearing comprising an outer member with an inner spherical raceway, an inner member having a center guiding rib, a concave raceway on each side of said rib and opposite the spherical raceway, a series of rollers in each concave raceway engaging the spherical raceway, a retainer between the two series of rollers, said retainer having a ring slidably carried on said center rib and abutting the inner ends of each series of rollers, a series of spaced fingers on said ring for separating the rollers of one series, said ring having a ledge over the entire center rib, a second ring slidably carried on the ledge and fingers on the second ring separating the rollers of the second series.

References Cited in the file of this patent

FOREIGN PATENTS

| | | |
|---|---|---|
| 759,733 | France | Nov. 23, 1933 |
| 1,188,894 | France | Mar. 16, 1959 |
| 532,193 | Italy | Aug. 12, 1955 |